Figure 1:
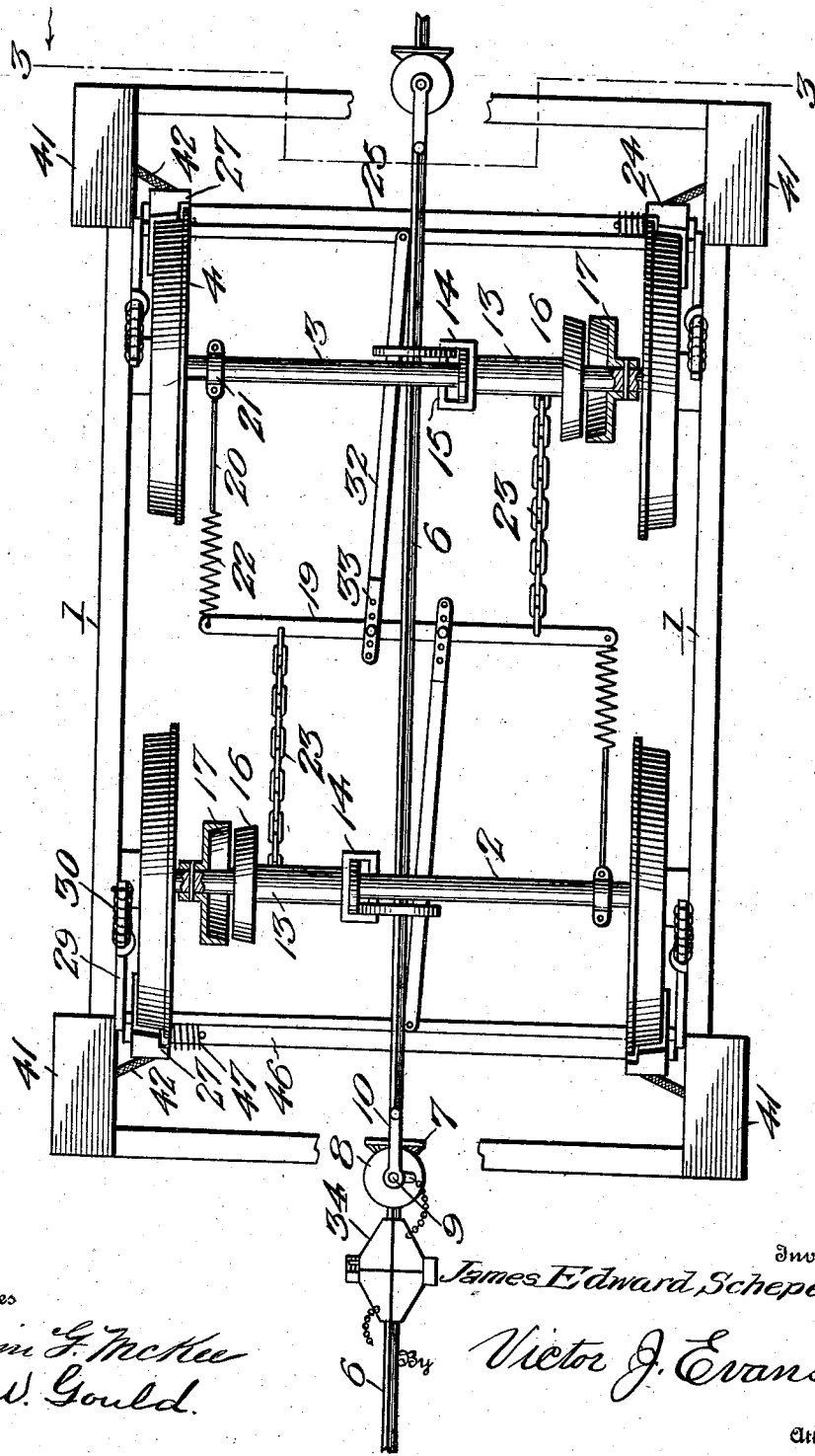

No. 858,308. PATENTED JUNE 25, 1907.
J. E. SCHEPER.
BRAKING MECHANISM.
APPLICATION FILED DEC. 8, 1906.

2 SHEETS—SHEET 1.

Witnesses
Edwin F. McKee
D. W. Gould

Inventor
James Edward Scheper
By Victor J. Evans
Attorney

THE NORRIS PETERS CO., WASHINGTON, D. C.

No. 858,308. PATENTED JUNE 25, 1907.
J. E. SCHEPER.
BRAKING MECHANISM.
APPLICATION FILED DEC. 8, 1906.
2 SHEETS—SHEET 2.
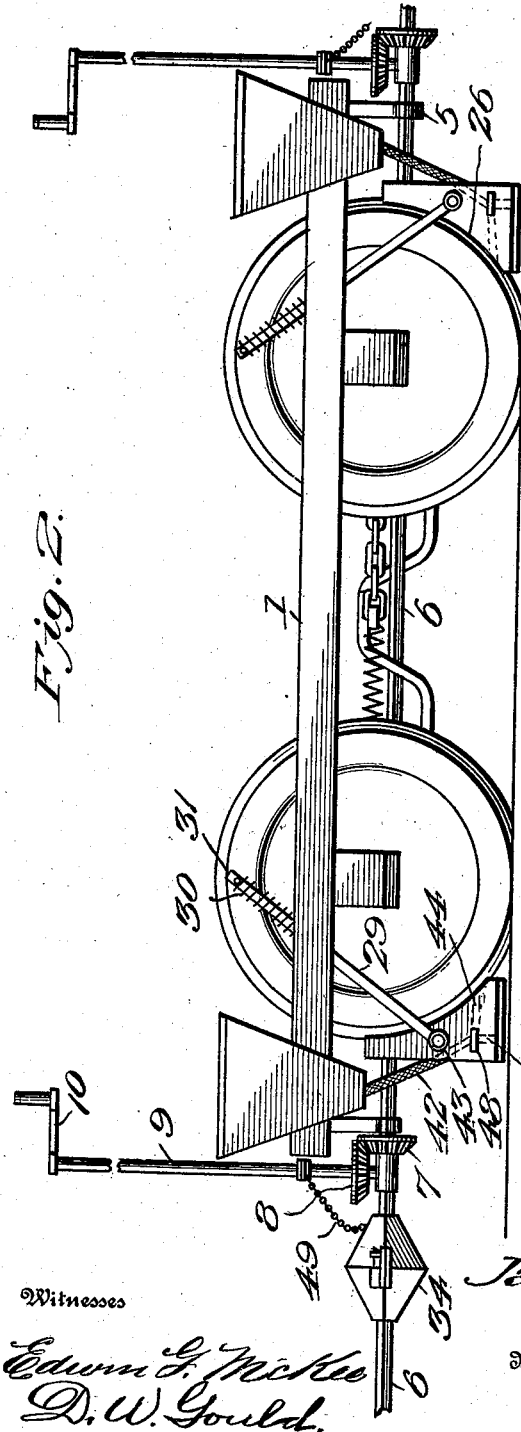
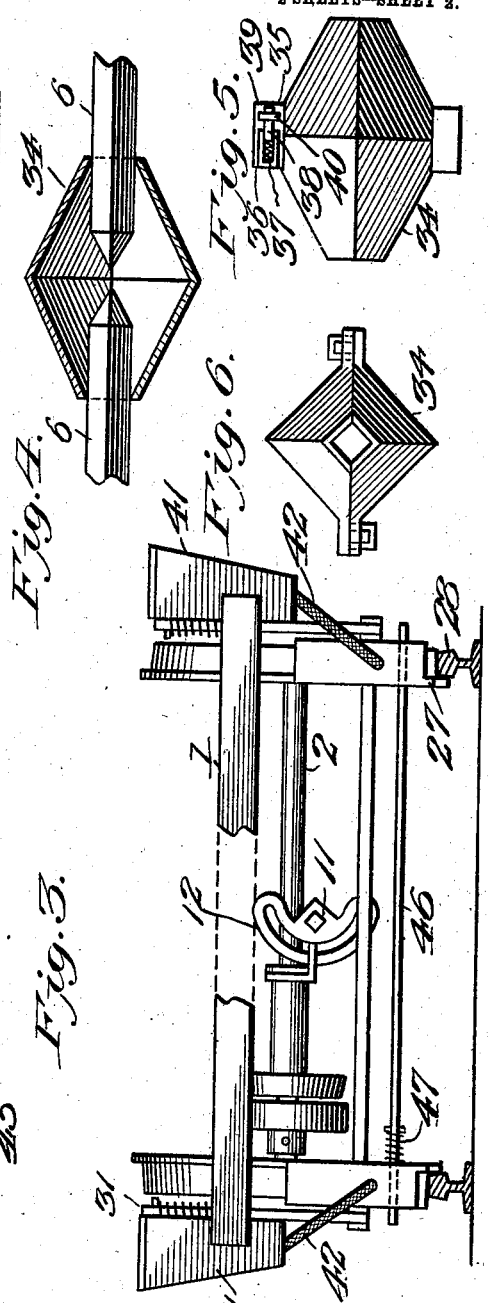

UNITED STATES PATENT OFFICE.

JAMES EDWARD SCHEPER, OF BALTIMORE, MARYLAND.

BRAKING MECHANISM.

No. 858,308. Specification of Letters Patent. Patented June 25, 1907.

Application filed December 8, 1906. Serial No. 346,923.

*To all whom it may concern:*

Be it known that I, JAMES EDWARD SCHEPER, a citizen of the United States, residing at Towson, in the city of Baltimore and State of Maryland, have invented new and useful Improvements in Braking Mechanism, of which the following is a specification.

The invention relates to an improvement in braking mechanism designed primarily for use on wheeled track traveling vehicles.

The main object of the present invention is the provision of means whereby the brakes are entirely operated through the revolution of the wheel axles, manually operable means being provided for moving the braking mechanism within the influence of the axles.

A further object of the present invention is the provision of a manually operable means extending throughout the length of the train and adapted in operation to simultaneously effect the braking mechanism of all cars.

The invention will be described in the following specification, reference being had particularly to the accompanying drawings, in which:—

Figure 1 is a bottom plan of the running gear of a car illustrating the application thereto of my improved braking mechanism, Fig. 2 is a side elevation of the same, Fig. 3 is a section on line 3—3 of Fig. 1, Fig. 4 a sectional view of the coupler between the brake rods of adjacent cars, the rods being shown therein, Fig. 5 is a top plan of the coupler, Fig. 6 an end view of the same.

Referring particularly to the drawings, wherein similar reference numerals indicate like parts throughout the several views, my improved braking mechanism is applied to a car including a body framework 1 in which is mounted the front and rear axles 2 and 3 carrying the usual flange wheels 4.

Extending centrally and longitudinally of the car and revolubly supported in end hangers 5 is what I term a brake rod 6 preferably of diamond shape in transverse section. The rod is of a length to project beyond the ends of the particular car and is provided adjacent each end with a bevel gear 7 arranged to mesh with a bevel gear 8 fixed upon an operating rod 9, the latter being arranged for manual operation through a handle or wheel 10, as desired. Motion is thus transmitted to the brake rod 6 in an obvious manner from either end of the car.

Secured upon the rod 6 adjacent each of the axles 2 and 3 is a cam plate 11 formed with an eccentrically disposed slot 12, which slot is so disposed that the terminal ends are a greater distance from the shaft 11 than the intermediate portion. The cam plates are arranged adjacent the respective axles and between said axles and the approximate ends of the car, as clearly shown in Fig. 1. Freely mounted upon each axle is a sleeve 13 with the relatively inner end disposed adjacent the cam plate 11. The end of the sleeve adjacent the cam plate is provided with a frame 14 secured upon the sleeve against independent longitudinal movement but in a manner to permit free independent revoluble movement thereof. A cross bar 15 of the frame extends through the slot 12 in the cam plate, so that the sleeve 13 is connected to the cam plate to provide for the longitudinal movement of the sleeve without interfering with its revoluble movement. The relatively outer end of each sleeve is provided with a friction head 16 preferably of slightly conical formation in longitudinal section and adapted to frictionally engage the cup shaped member 13 secured upon the axle through the medium of a transverse pin 18. The head and cup together provide an ordinary form of clutch which in operative position provides for transmitting the rotation of the axle to the sleeve 13.

Pivotally secured between the axles 2 and 3 is a brake beam 19. The opposing ends of the brake beam are connected to the axles 2 and 3 through the medium of an arm 20 projecting from the collar 21 loosely encircling the respective axles, and a coil spring 22 terminally secured to the arm and to the brake beam.

It is to be understood that the sleeves 13 on the respective axles are disposed on opposite sides of the brake bar, so that the sleeve on one axle is adjacent the wheel at one end thereof, while the sleeve on the other axle is adjacent the relatively opposite wheel on that axle. The sleeves 13 are connected to the brake beam 9 through the medium of flexible connections, as chains 23, these connections being on opposite sides of the pivotal support of the beam and, therefore, tending to move the beam in one direction upon the shortening of the connection. The brake shoes 24 are arranged in pairs for each of the respective pairs of wheels, each pair of shoes being connected by a bar 25 to insure their simultaneous movement. The shoes are of identical construction comprising approximately rectangular blocks having one face curved at 26 to conform to the curvature of the wheel and the lower face formed with a depending flange 27 to co-operate with the track rail 28 similar to the engagement of the flanged wheel therewith. The shoes are mounted beyond the respective wheels, that is the shoes are arranged between the peripheries of the wheels and the adjacent ends of the car, being normally supported so that their braking surfaces are equally spaced from the track rail and the periphery of the wheel. Each brake shoe is removably connected to a supporting rod 29 extending upwardly and inwardly toward the transverse center of the car, being projected through the side bars of the body frame and provided above said bars with an encircling spring 30 bearing between the upper surface of the bar and a cross pin 31 on the rod. As thus supported the initial movement of the shoe under the operation to be described is toward the periphery of the wheel, the yielding of the spring 30, however, permitting an independent downward movement of the shoe under the influence of the frictional grip of the forward wheels of the car to force the lower braking surface of the shoe into engagement with the track rail. A link bar 32 is connected with each bar 25 of the brake shoe extending therefrom to and being connected with the brake beam 19. The links 32 are preferably formed with a series of openings 33 in the beam end to permit adjustable connection of said links with the brake beam, it being understood that the respective links are connected to the beam on opposite sides of and of equal distance from the pivotal center of the latter.

Each end of the brake bar 6 is provided with a coupling head 34, preferably of hollow pyramidal shape, the apex being secured to the rod, as clearly shown in Fig. 4. Adjacent the base and on opposite edges each coupling member is provided with one or two members of a securing device 35, it being understood that the remaining members of each of said securing devices are provided on the co-operating head of the brake bar of the adjacent car. The securing devices comprise a latch member 36 including a housing 37 in which is slidably disposed a spring pressed pin 38, and a keeper member 39 having an eye or keeper 40 to receive the bolt.

As before described it is to be understood that each coupling head is provided with a latch member and with a keeper member on opposite sides thereof, the co-operating members of the securing means being reversely formed on the coupling head of the adjacent car.

By this arrangement of parts the brake bar 6 of one car is automatically coupled with the brake bar of the adjacent cars, so that in a completed train the brake bar is in effect a single continuous rod throughout the length of the train. The construction of the coupling heads provides for the necessary independent movement of the end of the brake bars of the respective cars when said cars are traveling in a curve or subjected to slight independent movement incident to the swaying of the cars in travel.

In conjunction with the braking mechanism described and as a necessary adjunct thereto I arrange a sanding mechanism whereby the material may be delivered to the brake shoe for the more effective operation of the latter. The sanding mechanism includes a sand box supported on the car-body directly above each brake shoe, and in communication with the sand channels in the brake shoe through a flexible tubular connection 42. Within the shoe is arranged an inlet channel 43 communicating at its lower end with a wheel channel 44 and with a track channel 45. A controlling cut-off 46 is arranged to be operated by any suitable mechanism from the platform of the car, comprising preferably an elongated plate, spring pressed in one direction through the medium of a spring 47, and mounted in transversely disposed openings 48 formed in the respective brake shoes, it being understood that one cut-off plate co-operates with each pair of shoes. The plate is arranged at the junction of the channels 43, 44 and 45, being formed with two spaced openings so disposed that in the arrangement of the rod in one position the sand will be directed to the periphery of the wheel, while in a second position the sand will be directed to the surface of the track rail, the normal position of the plate under the influence of the spring 47 being such that both of the channels 44 and 45 are cut off from the supply channels 43. The operator may thus direct the sand to the periphery of the wheel 4 or to the surface of the track rail, the normal position of the plate 46, however, cutting off all supply of sand. The use of the sand is effective in increasing the efficiency of the brake shoe, though it is to be understood that the discharge of the sand may be controlled independent of the operation of the brake shoes and utilized to provide a gripping action between the wheel and rail.

Assuming the parts constructed and arranged as described, the operator desiring to set the brakes will impart a partial rotation to the brake rod 6, thereby turning the cam plates 11 and, through the slots 12 therein force the sleeve 14 longitudinally of the axles. This movement of the sleeves will force the head 16 into the cup 17 with the result that the sleeves are in effect secured to the axles and revolved therewith. The chains 23 are immediately wound about the sleeves with the effect to draw upon the bars 25 through the medium of the brake beam 19 and the links 32 and set the brakes. A reverse movement of the brake bar 6 withdraws the sleeve from co-operation with the cup 17 and thereby permits the brake shoes to move away from the peripheries of the wheel and the surface of the track. In the initial movement of those shoes on the forward wheels, the braking surface of the shoe is first brought into contact with the periphery of the wheel, being, however, immediately thereafter, if the brakes are set with full force, moved downward by the frictional engagement of the wheel and forced onto the track surface, thereby insuring a double braking action, which braking action on the surface of the rails is due entirely to the weight and momentum of the car. It is, of course, obvious that if the co-operation of the clutch members 16 and 17 is slight, as may be regulated by the operator, the effective engagement of the brake shoes will be correspondingly slight, hence permitting the operator to readily and accurately control the braking force.

The cam plates 11 serve to insure the co-operation of the clutch members, and these plates are moved to either extreme position by practically a quarter turn of the brake rod. The brakes may thus be quickly and effectively set with a minimum of effort and without appreciable loss of time on the part of the operator, thereby providing a hand brake particularly adapted for emergency operation. The coupling heads of the brake bar may, if desired, be connected to the operating rod 9 through the medium of chains 49, though such is not considered absolutely essential.

The use of the practically continuous brake rod throughout the length of the train insures the setting of all brakes in the operation of one operating rod 9, and the power of the operator is directed solely to revolving the rod 6, the revolution of which is effective for causing co-operation of the clutch members, after which the braking operation is entirely automatic. The return of the brake beam 19 to normal position is provided for in the use of the connecting members 20 and 22 thereby insuring a speedy release of the brakes when the brake bar is returned to normal position to disengage the clutch members through movement of the cam plate.

Having thus described the invention what is claimed as new, is:—

1. The combination with a braking mechanism including brake shoes arranged to co-operate with the wheels and track rails, of a sanding mechanism, and means to deliver the material through the shoes to the wheels or to the rails.

2. A braking mechanism including shoes arranged to co-operate with the wheels and with the track rails, of sanding mechanism arranged to deliver the material through the shoes, and means for controlling the delivery of material to direct the same to the wheels or to the rails.

3. A braking mechanism for a wheeled vehicle comprising brake shoes, a clutch member secured upon the wheel axle, a clutch member operatively connected to the shoes and movably mounted on the wheel axle, a brake rod, and cam plates carried by the brake rod and adapted to operate the movable clutch member in both directions.

4. Braking mechanism including brake shoes, clutch members, one of said members being positively driven in the movement of the vehicle, a brake rod extending longitudinally of the vehicle, cam plates formed with cam slots and secured on said rod, and a connection between each of said plates and the remaining member of the clutch.

5. A braking mechanism for wheeled vehicles comprising brake shoes, a clutch including a member fixed on the axle and a member movably mounted thereon, a brake rod extending longitudinally of the car, a cam plate carried by the rod and formed with a slot, a frame connected to the movable clutch member and engaging the slot in the cam plate, a brake beam supported on the vehicle, a connection between the brake beam and shoe, and a connection between said beam and the movable clutch member, whereby upon engagement of the clutch members the brake shoes are forced into contact with the wheels.

In testimony whereof, I affix my signature in presence of two witnesses.

JAMES EDWARD SCHEPER.

Witnesses:
   JOHN A. BENNING,
   JOS. H. SCHEPERD.